United States Patent
Goncze et al.

(10) Patent No.: US 7,163,157 B2
(45) Date of Patent: Jan. 16, 2007

(54) AUTOMATIC COMPENSATING VALVE FOR INDIVIDUAL SHOWER AND TUB/SHOWER COMBINATION FIXTURES

(75) Inventors: Zoltan Goncze, Sandown, NH (US); James C. Graves, Lake Forest, IL (US)

(73) Assignee: Watts Regulator Co., North Andover, MA (US)

( * ) Notice: Subject to any disclaimer, the term of this patent is extended or adjusted under 35 U.S.C. 154(b) by 299 days.

(21) Appl. No.: 10/803,534

(22) Filed: Mar. 17, 2004

(65) Prior Publication Data
US 2005/0116053 A1    Jun. 2, 2005

Related U.S. Application Data

(60) Provisional application No. 60/526,710, filed on Dec. 2, 2003.

(51) Int. Cl.
*G05D 23/13* (2006.01)
(52) U.S. Cl. .............................. 236/12.16; 236/12.17; 236/12.18; 236/12.19; 236/12.2; 236/12.21; 236/12.22
(58) Field of Classification Search ............. 236/12.16, 236/12.17, 12.18, 12.19, 12.2, 12.21, 12.22, 236/12.23, 93 A, 99 K
See application file for complete search history.

(56) References Cited

U.S. PATENT DOCUMENTS

| | | | |
|---|---|---|---|
| 4,164,321 A | 8/1979 | Riis | |
| 4,304,358 A | 12/1981 | Riis | |
| 4,508,262 A | 4/1985 | Pedersen et al. | |
| 4,508,263 A | 4/1985 | Pedersen et al. | |
| 4,607,788 A | 8/1986 | Bendall et al. | |
| 4,640,457 A | 2/1987 | MacDonald | |
| 4,669,653 A | 6/1987 | Avelov | |
| 4,739,793 A | 4/1988 | Vollmer | |
| 4,819,867 A | 4/1989 | Delpla et al. | |
| 4,863,097 A | 9/1989 | Avelov | |
| 4,901,916 A | 2/1990 | Avelov | |
| 4,915,295 A | 4/1990 | Pullen et al. | |
| 4,976,460 A | 12/1990 | Newcombe et al. | |

(Continued)

OTHER PUBLICATIONS

Powers, a Watts Industries Co. "Technical Instructions; BILTMORE Series 900; Pressure-Balancing Valves; Model 3" Form TI900, pp. 1-4; Powers, a Watts Industries Co., Canada, Nov. 2002.

*Primary Examiner*—Marc Norman
(74) *Attorney, Agent, or Firm*—Fish & Richardson P.C.

(57) ABSTRACT

An automatic compensating valve, e.g., for individual shower and tub/shower combination fixtures, has a valve body defining cold and hot water inlet flow passageways, a mixing chamber, a mixed temperate water outlet flow passageway, and an axial bore. The valve includes a plunger that defines, with other elements of the valve, a first orifice for communication of the cold water inlet with said mixing chamber and a second orifice for communication of hot water inlet with mixing chamber. The plunger is mounted within a mixing subassembly for axial movement within the bore, including in response to temperature of water within the mixing chamber to vary the ratio of flow of cold water through the first orifice to flow of hot water through the second orifice. The first orifice and the second orifice are arranged for flow of water transverse to axial movement of the plunger within the bore. The valve further includes a wax motor mounted axially within the bore for positioning of the plunger in response to temperature of water within the mixing chamber.

20 Claims, 16 Drawing Sheets

U.S. PATENT DOCUMENTS

| | | |
|---|---|---|
| 5,011,074 A | 4/1991 | Kline |
| 5,067,513 A | 11/1991 | Nicklas et al. |
| 5,129,576 A | 7/1992 | Pullen et al. |
| 5,143,286 A | 9/1992 | Hansen et al. |
| 5,148,976 A | 9/1992 | Reid |
| 5,205,483 A | 4/1993 | Kostorz |
| 5,340,018 A | 8/1994 | MacDonald |
| 5,350,112 A | 9/1994 | Stein |
| 5,356,074 A | 10/1994 | Limet et al. |
| 5,427,312 A | 6/1995 | Simonov et al. |
| 5,535,943 A | 7/1996 | Kahle et al. |
| 5,904,291 A | 5/1999 | Knapp |
| 5,931,374 A | 8/1999 | Knapp |
| 5,971,285 A | 10/1999 | Knapp |
| 6,079,625 A | 6/2000 | Lebkuchner |
| 6,089,462 A | 7/2000 | Osvaldo |
| 6,119,947 A | 9/2000 | Couture et al. |
| 6,250,559 B1 | 6/2001 | Knauss |
| 6,315,209 B1 | 11/2001 | Tripp |
| 6,315,210 B1 | 11/2001 | Kline |
| 6,341,731 B1 | 1/2002 | Knapp |
| 6,364,210 B1 | 4/2002 | Lorch |
| 6,454,175 B1 | 9/2002 | Lorch |
| 6,471,132 B1 | 10/2002 | Knapp |
| 6,517,006 B1 | 2/2003 | Knapp |
| 6,543,478 B1 | 4/2003 | Kline |
| 6,585,167 B1 | 7/2003 | Wolber et al. |

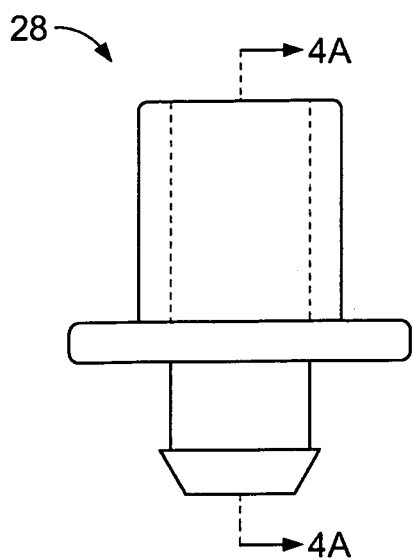
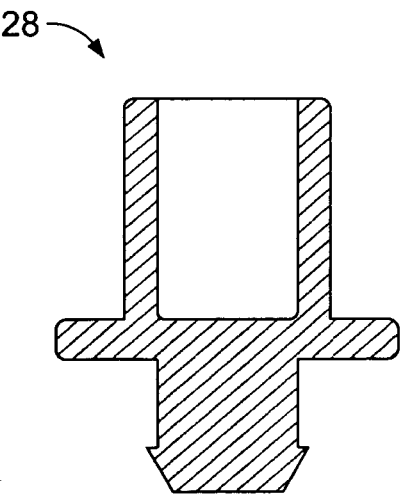
FIG. 4  FIG. 4A
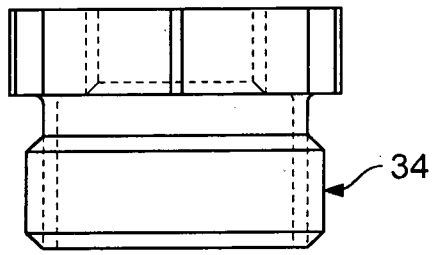
FIG. 5
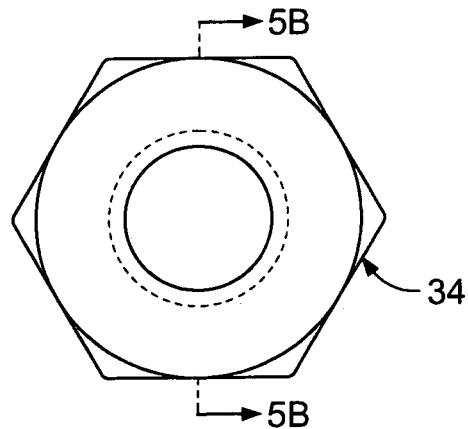
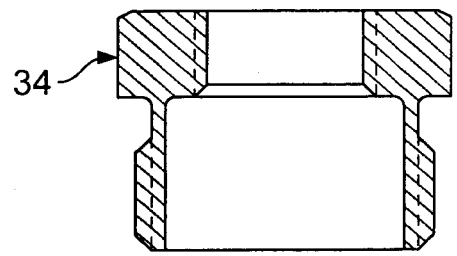
FIG. 5A  FIG. 5B

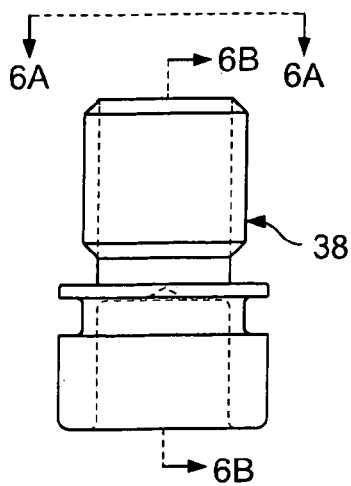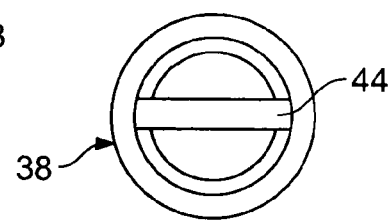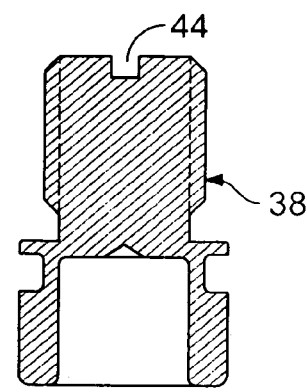
FIG. 6  FIG. 6A  FIG. 6B
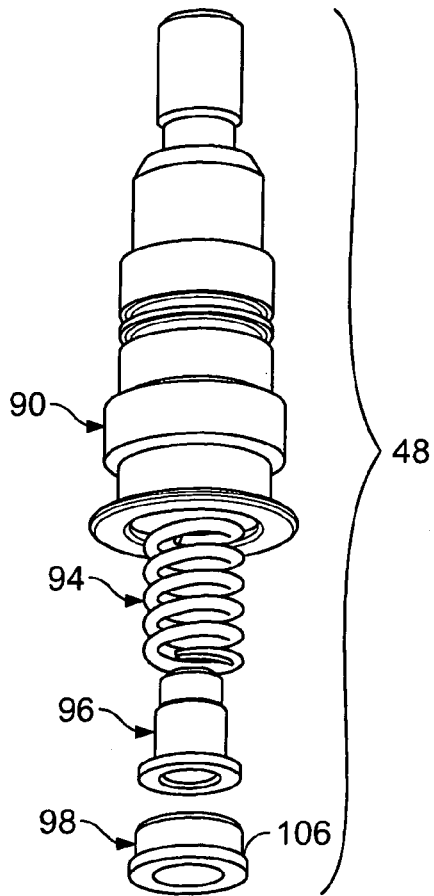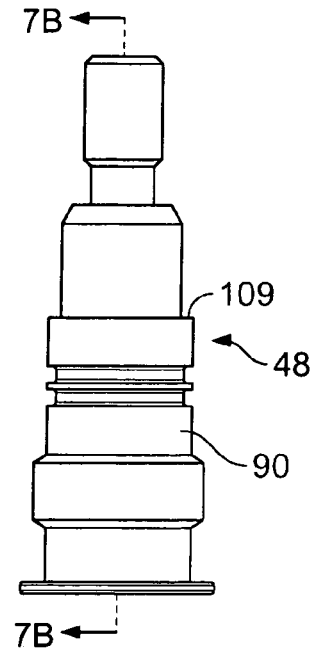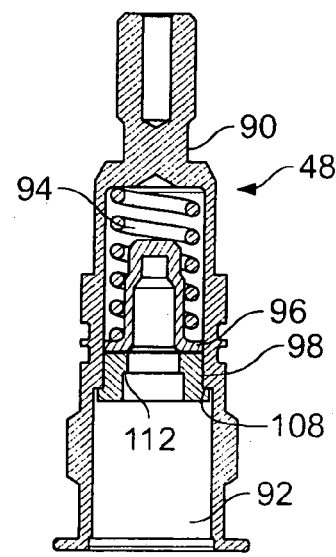
FIG. 7  FIG. 7A  FIG. 7B

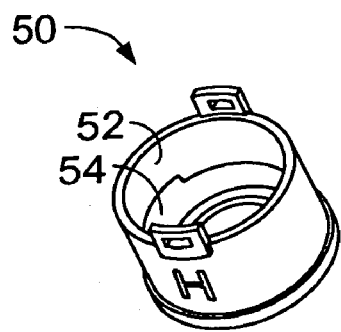 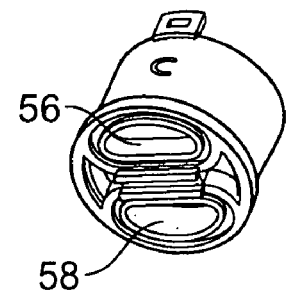
FIG. 8    FIG. 8A
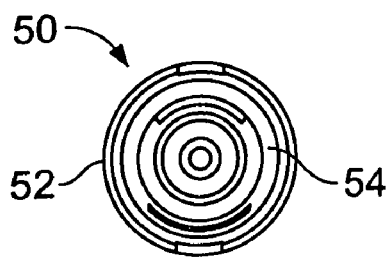 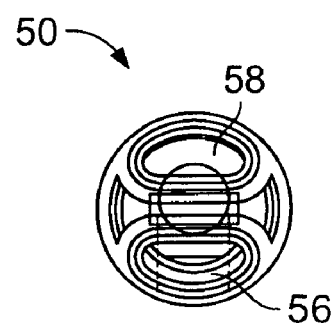
FIG. 8B    FIG. 8C
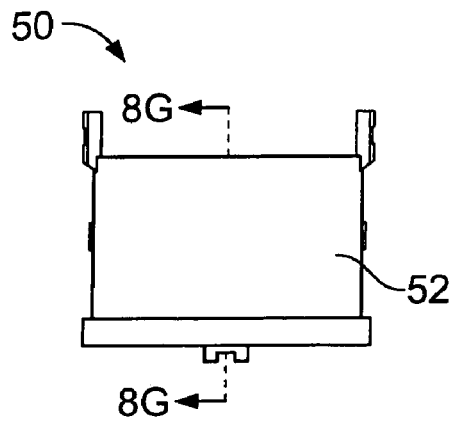 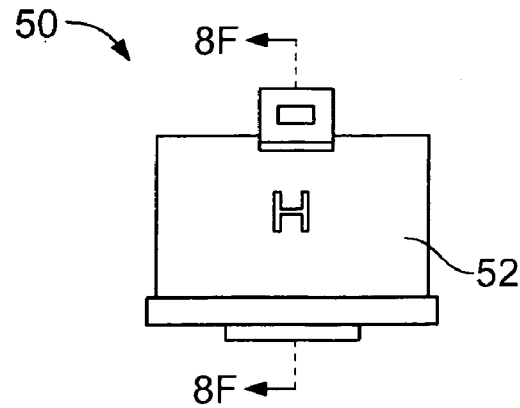
FIG. 8D    FIG. 8E

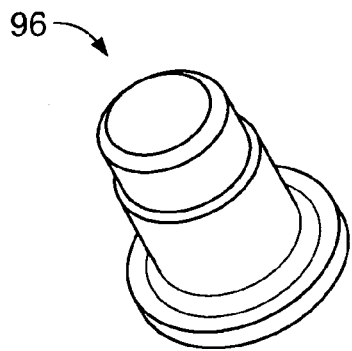
FIG. 13
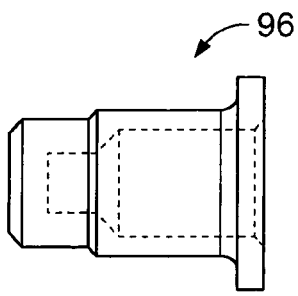
FIG. 13A
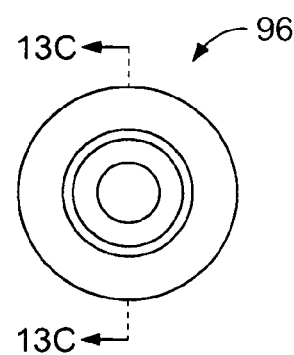
FIG. 13B
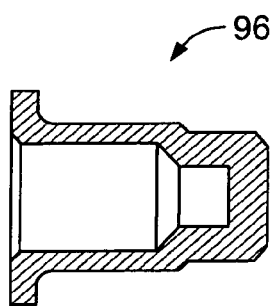
FIG. 13C
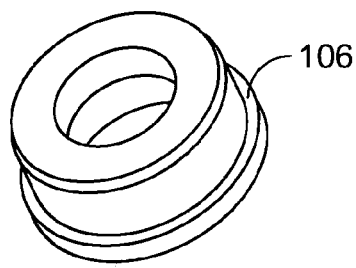
FIG. 14
FIG. 14A
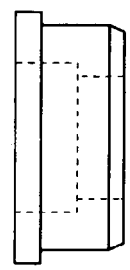
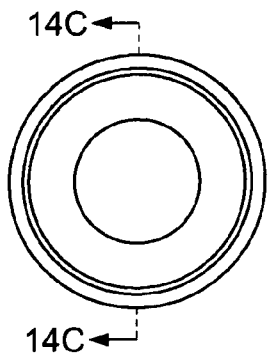
FIG. 14B
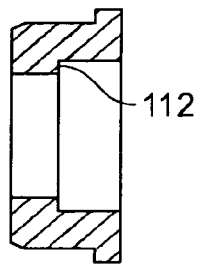
FIG. 14C

| Powers P/N | Description | Temperature to Measure "L" | Load to Measure "L" | "L" |
|---|---|---|---|---|
| 420-024 | Standard Temp. Element | 110°F | 10 LBS | 2.152 |

AUTOMATIC COMPENSATING VALVE FOR INDIVIDUAL SHOWER AND TUB/SHOWER COMBINATION FIXTURES

TECHNICAL FIELD

This application claims benefit from U.S. Provisional Patent Application No. 60/526,710, filed Dec. 2, 2003, the complete disclosure of which is incorporated herein by reference.

This invention relates to water flow control valves, and more particularly to automatic compensating valves.

BACKGROUND

It has been known to provide point of supply valves for controlling water temperature with changes in supply temperature and pressure. It is also known to provide point of use thermostatic control valves and combination valves.

SUMMARY

According to one aspect of the invention, an automatic compensating valve, e.g. for individual shower and tub/shower combination fixtures, comprises: a valve body defining a cold water inlet flow passageway, a hot water inlet flow passageway, a mixing chamber, a mixed temperate water outlet flow passageway, and an axial bore; a plunger defining, with other elements of the valve, a first orifice for communication of the cold water inlet with the mixing chamber and a second orifice for communication of the hot water inlet with the mixing chamber, the plunger being mounted within a mixing subassembly for axial movement within the bore, including in response to temperature of water within the mixing chamber to vary the ratio of flow of cold water through the first orifice to flow of hot water through the second orifice, the first orifice and the second orifice being arranged for flow of water transverse to axial movement of the plunger within the bore; and a wax motor mounted axially within the bore for positioning of the plunger in response to temperature of water within the mixing chamber.

Preferred embodiments of this aspect of the invention may include one or more of the following additional features. The automatic compensating valve further comprises a spring biasing the plunger towards a relatively greater ratio of flow of hot water to flow of cold water into the mixing chamber. The automatic compensating valve further comprises a spring biasing the wax motor and the plunger towards a relatively greater ratio of flow of cold water to flow of hot water into the mixing chamber. The plunger is positioned upon opening for initial preferential flow of cold water into the mixing chamber. The automatic compensating valve further comprises a poppet check and shutoff valve assembly in each of the cold water inlet flow passageway and the hot water inlet flow passageway. The automatic compensating valve further comprises the mixing subassembly disposed axially within the bore and a stem subassembly disposed axially within the bore. The stem subassembly and the mixing subassembly are accessible from the face of the valve. The automatic compensating valve is configured for use at individual shower and tub/shower combination fixtures.

The invention thus provides an automatic compensating valve, e.g. for individual shower and tub/shower combination fixtures, that automatically mixes hot and cold water at the point of use, to provide and maintain blended water within a specified temperature range. The wax element or thermostatic motor responds quickly to compensate for temperature fluctuations induced by changes in water temperatures and for changes in water pressure. In the event of loss of cold water feed, the thermostatic motor reacts rapidly to shut off, or at least to virtually shut off, hot water flow. Also, the valve opens in cold water position, thereby to ensure maximum bather safety and comfort. Furthermore, the hot water and cold water flows are delivered radially into the mixing chamber, thus to avoid unwanted pressure effects on the control of flow, e.g. as often experienced with more typical axial feed. Finally, all of the valve components are accessible from the front of the valve, e.g. for less complicated repair and/or replacement.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a top plan view of the valve body of the automatic compensating valve of FIG. 1; while

FIG. 4 is a front view of the check poppet of the poppet check and shutoff valve assemblies of the automatic compensating valve of FIG. 1; while FIG. 4A is a side section view of the check poppet, taken at the line 4A—4A of FIG. 4.

FIG. 5 is a front view of the check sleeve of the poppet and shutoff valve assemblies of the automatic compensating valve of FIG. 1; while FIG. 5A is a top view of the check sleeve; and FIG. 5B is a side section view of the check sleeve, taken at the line 5B—5B of FIG. 5.

FIG. 6 is a front view of the check stem of the poppet check and shutoff valve assemblies of the automatic compensating valve of FIG. 1; while FIG. 6A is a top view of the check stem; and FIG. 6B is a side section view of the check stem, taken at the line 6B—6B of FIG. 6.

FIG. 7 is an exploded view of the stem subassembly of the automatic compensating valve of FIG. 1; while FIG. 7A is a front view of the stem subassembly of FIG. 7; and FIG. 7B is a side section view of the stem subassembly, taken at the line 7B—7B of FIG. 7A.

FIG. 8 is a top perspective view of the base element of the mixing subassembly of the automatic compensating valve of FIG. 1; while FIG. 8A is a bottom perspective view of the base element of FIG. 8; FIG. 8B is a top view of the base element of FIG. 8; FIG. 8C is a bottom view of the base element of FIG. 8; FIG. 8D is a side view of the base element of FIG. 8; FIG. 8E is a front view of the base element of FIG. 8D.

FIG. 9 is a top perspective view of the sleeve of the mixing subassembly of the automatic compensating valve of FIG. 1; while

FIG. 10 is a side view of the seat cage of the mixing subassembly of the automatic compensating valve of FIG. 1; while

FIG. 11 is a top perspective view of the plunger of the mixing subassembly of the automatic compensating valve of FIG. 1; while

FIG. 12 is a perspective view of the stem of the stem subassembly of the automatic compensating valve of FIG. 1; while

FIG. 13 is a perspective view of the overload insert of the stem subassembly of the automatic compensating valve of FIG. 1; while FIG. 13A is a front view of the overload insert of FIG. 13; FIG. 13B is a bottom view of the overload insert of FIG. 13; and FIG. 13C is a side section view of the overload insert, taken at the line 13C—13C of FIG. 13B.

FIG. 14 is a perspective view of the overload stop of the stem subassembly of the automatic compensating valve of FIG. 1; while FIG. 14A is a side view of the overload stop of FIG. 14; FIG. 14B is a top view of the overload stop of FIG. 1; and FIG. 14C is a side section view of the overload stop, taken at the line 14C—14C of FIG. 14B.

FIG. 15 is a perspective view of the cartridge nut of the automatic compensating valve of FIG. 1; while

FIG. 16 is a perspective view of the bonnet of the automatic compensating valve of FIG. 1; while

FIG. 17 is a perspective view of the high temperature stop of the automatic compensating valve of FIG. 1; while

Like reference symbols in the various drawings indicate like elements.

DETAILED DESCRIPTION

Figure 1:
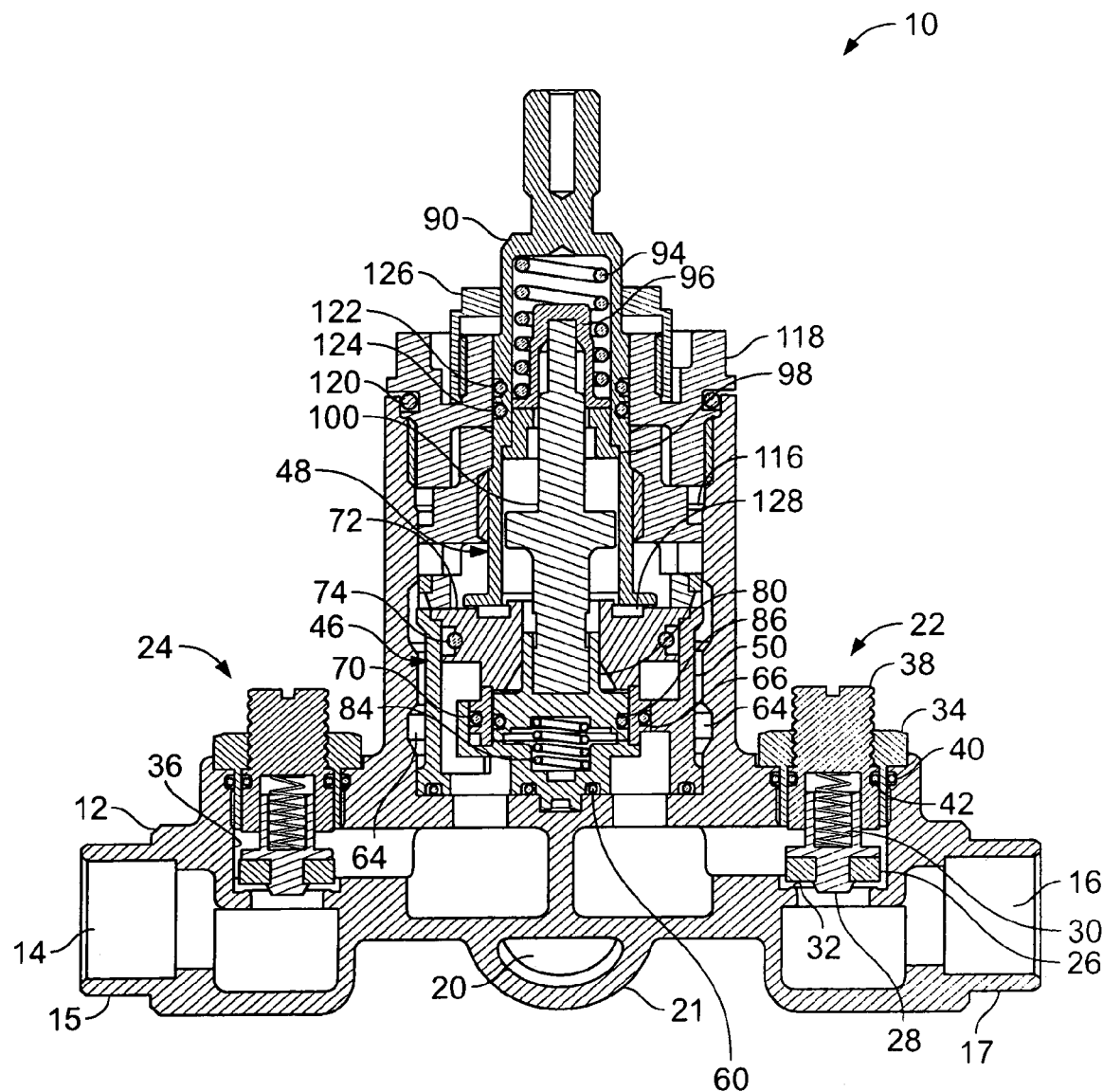
FIG. 1 is a bottom section view of an automatic compensating valve of the invention, e.g. for individual shower and tub/shower combination fixtures.
Figure 2:
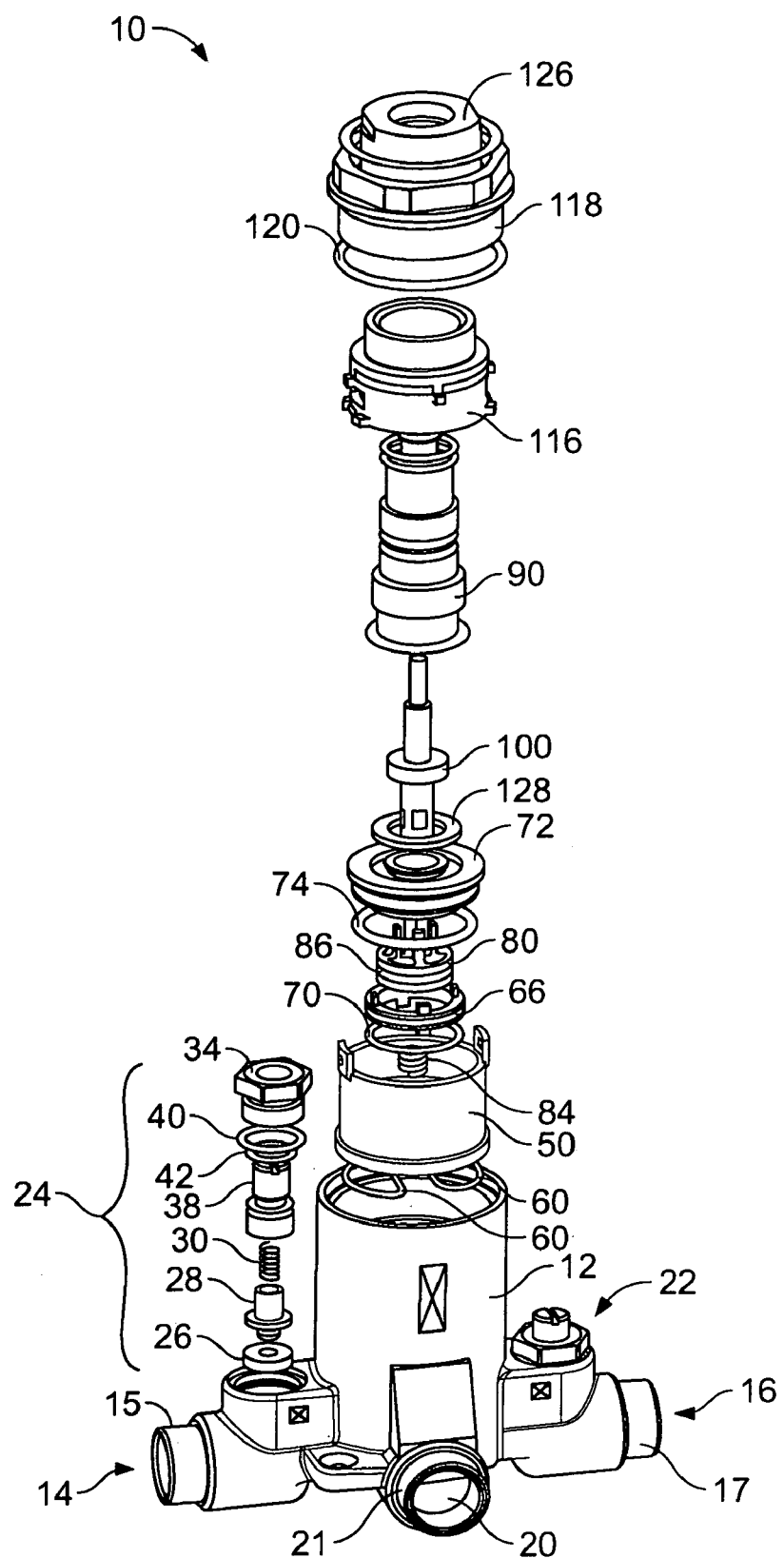
FIG. 2 is an exploded perspective view of the automatic compensating valve of FIG. 1.
Figure 3:
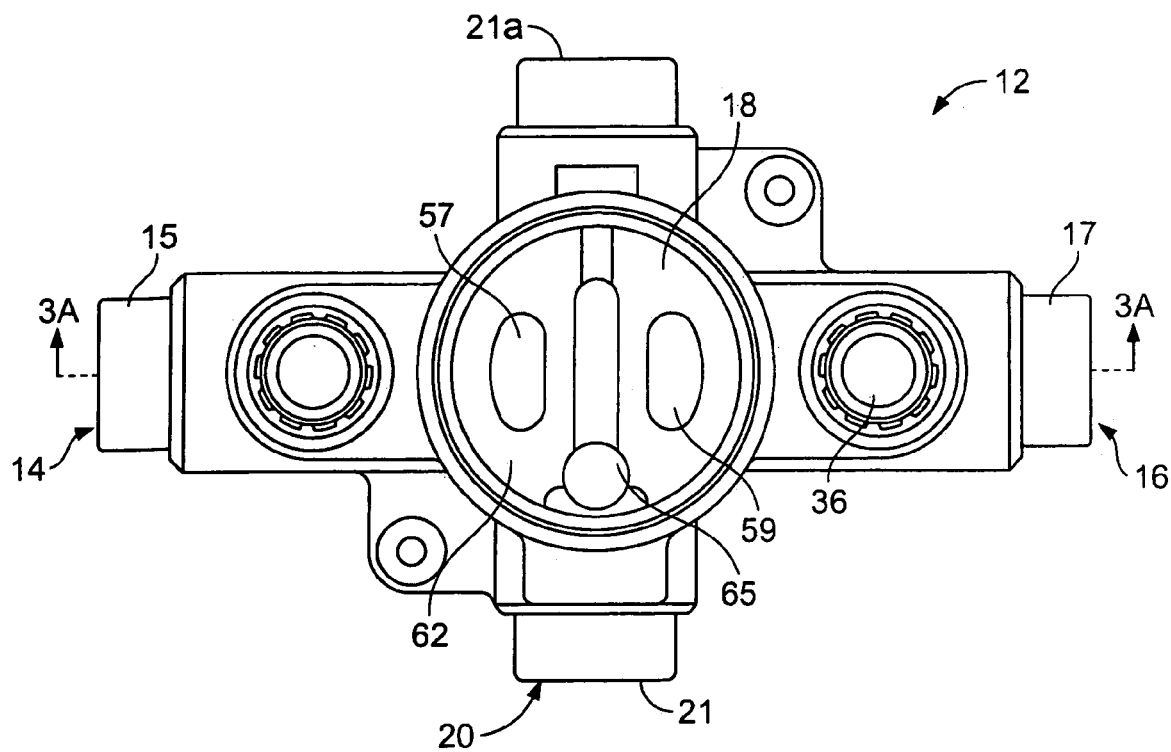
Figure 3A:
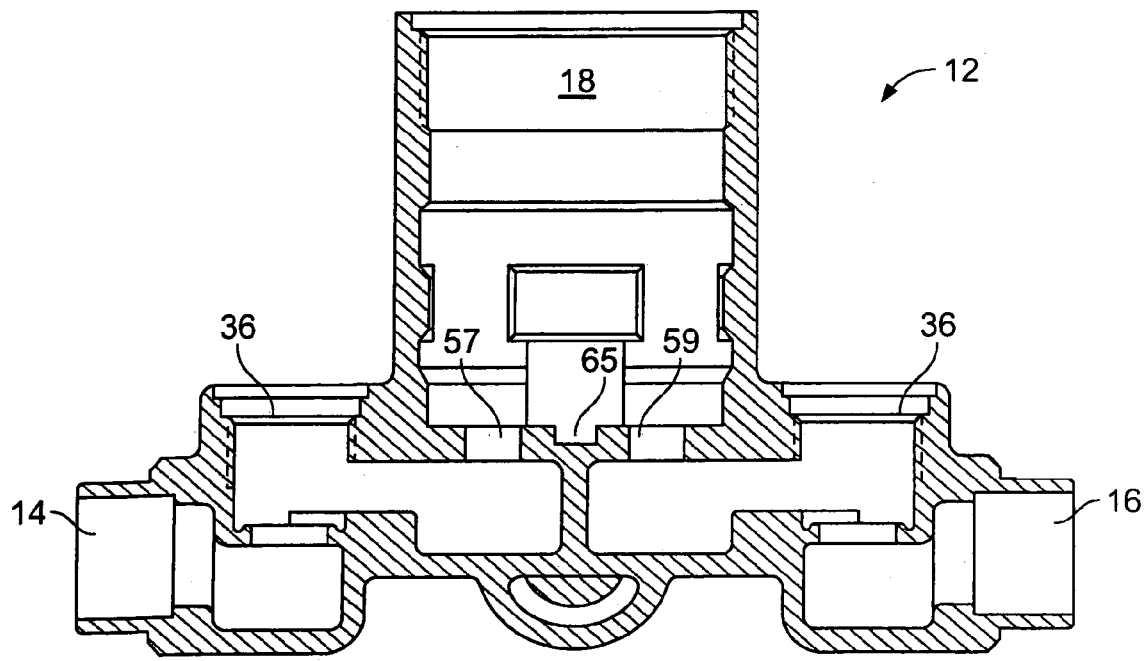
FIG. 3A is a front section view of the valve body, taken at the line 3A—3A of FIG. 3.

Referring to FIGS. 1 and 2, an automatic compensating valve 10 of the invention, e.g. for individual shower and tub/shower combination fixtures, has a body 12 (FIGS. 3 and 3A), e.g. formed of cast bronze, defining a cold water inlet flow passageway 14, a hot water inlet flow passageway 16, a bore 18, and a mixed temperate water outlet passageway 20. The cold and hot water inlets 15, 17, respectively are configured for sweat fitting to cold and hot water supply piping, respectively. The mixed water outlets 21, 21a are configured for sweat fitting to supply piping for delivering blended mixed water to the tub spout and/or to the shower head.

Disposed in the cold water inlet flow passageway 14 and in the hot water inlet flow passageway 16 are poppet check and shutoff valve assemblies 22, 24. Referring also to FIGS. 4–4A, 5–5B and 6–6B, each poppet check and shutoff valve assembly 22, 24 consists of a disc plunger 26, formed, e.g., of BUNA-N (acrylonitrile-butadiene) copolymer (70 to 75 durometer), mounted to a check poppet 28 and urged by a spring 30 toward sealing contact with an opposed seat 32 defined by the valve body 12. The check poppet 28 is mounted to a check stem 38, which is disposed in threaded engagement with a check sleeve 34. The check sleeve in turn is disposed in threaded engagement in an aperture 36 defined by the valve body 12, in each of the hot water and cold water inlet flow passageways 14, 16, respectively. The check stem 38 is axially adjustable relative to the check sleeve 34, as described more fully below. O-rings 40, 42 (e.g., EPDM (ethylene-propylene-diene copolymer), 70 durometer) provide sealing between the body 12 and the check sleeve 34 and between the check sleeve 34 and the check stem 38, respectively. Under normal inlet flow pressure, the disc plunger 26 and check poppet 28 are urged from the seat 32 to allow flow of cold water and flow of hot water, respectively, into the control valve bore 18. If inlet flow is lost, and/or a backflow condition develops, the disc plungers 26 are urged by the respective springs 30 into sealing contact with the opposed seats 32 defined by the body to resist flow through the passageway 14, 16. When it is desired to cease flow, e.g. for maintenance of the control valve, check stem 38 can be rotated in threaded engagement with check sleeve 36, e.g. by engagement of a screwdriver blade in slot 44, to bring the disc plunger 26 into sealing contact with the opposed valve seat 32, thereby to reduce or completely cease flow. The check poppet 28, check sleeve 34 and check stem 38 are all formed of suitable material, e.g. C36000 brass.

Figure 8F:
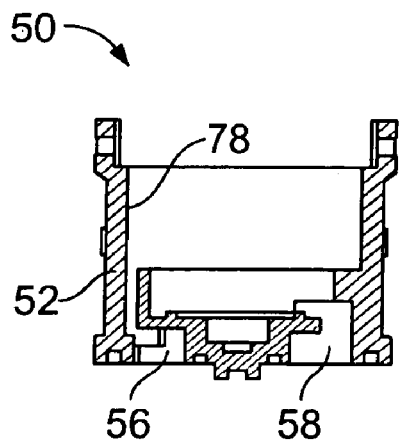
FIG. 8F is a side section view of the base element, taken at the line 8F—8F of FIG. 8E.
Figure 8G:
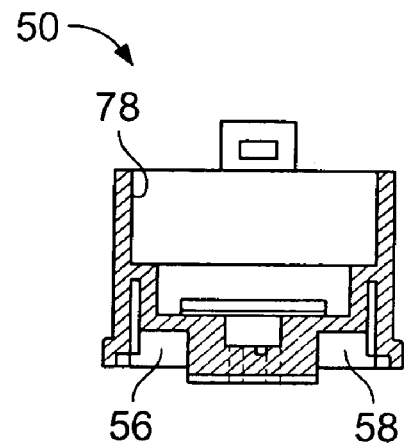
FIG. 8G is a front section view of the base element, taken at the line 8G—8G of FIG. 8D.

Disposed within the bore 18 of the valve body 12 are a mixing subassembly 46, and a stem subassembly 48 (FIGS. 7–7B). The mixing subassembly 46 consists of generally cylindrical base element 50 (FIGS. 8–8G) positioned within the bore 18 of valve body 12. The base element 50, formed, e.g., of acetal resin, e.g. as available under the trademark DELRIN® 500, Natural (acetal thermoplastic polymer), from E. I. du Pont de Nemours and Company, Inc. of Wilmington, Del., or other suitable ANSI/NSF Standard 61 listed material, has a cylindrical side wall 52 upstanding from a bottom wall 54. The bottom wall defines a pair of orifices 56, 58 disposed in registration with a cold water inlet 57 (from cold water inlet flow passageway 14) and a hot water inlet 59 (from hot water inlet flow passageway 16) in the bottom surface 62 of the bore 18 in valve body 12. O-rings 60 (e.g., EPDM (70 durometer)) provide sealing about the inlets at the interface between the opposed surfaces of the base element bottom wall 54 and the bottom surface 62 of the valve body bore 18. Annular region 64, defined by the inner wall of the bore 18 about the cylindrical side wall 52 of the base element 50, is disposed in communication with the mixed temperate water outlet 65 to the mixed temperate water outlet flow passageway 20 in the bottom surface 62 of valve body 12 for flow of mixed water to the tub or shower.

Figure 9:
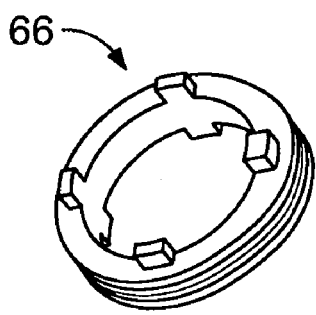
Figure 9A:
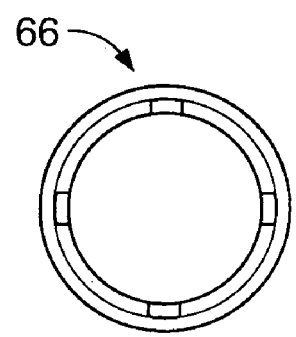
FIG. 9A is a top view of the sleeve of FIG. 9.
Figure 9B:
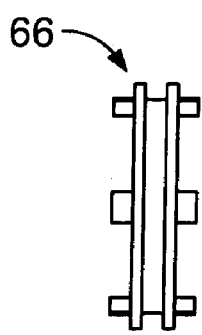
FIG. 9B is a side view of the sleeve of FIG. 9.
Figure 9C:
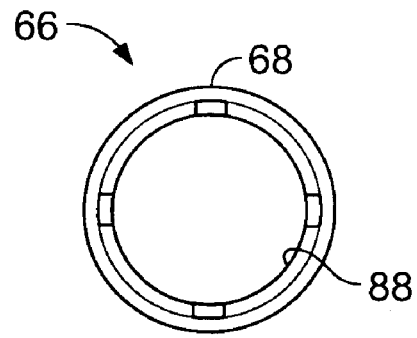
FIG. 9C is a bottom view of the sleeve of FIG. 9.
Figure 10A:
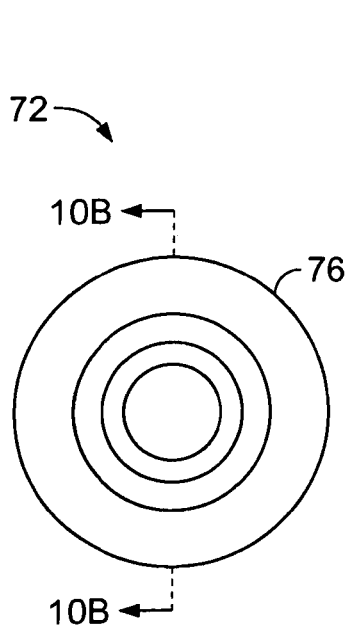
FIG. 10A is a top view of the seat cage of FIG. 10.
Figure 10:
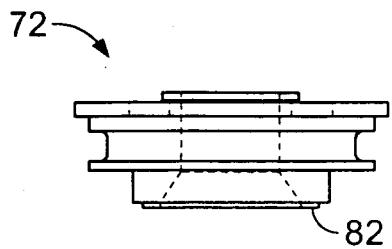
Figure 10B:
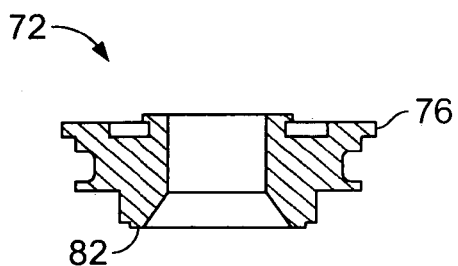
FIG. 10B is a side section view of the seat cage, taken at the line 10B—10B of FIG. 10A.
Figure 11:
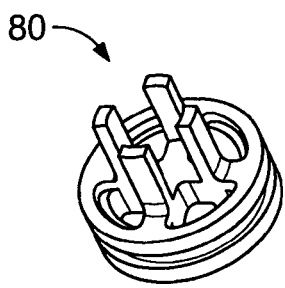
Figure 11A:
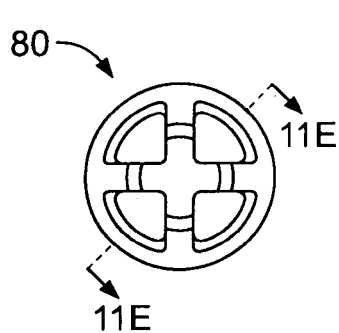
FIG. 11A is a top view of the plunger of FIG. 11.
Figure 11B:
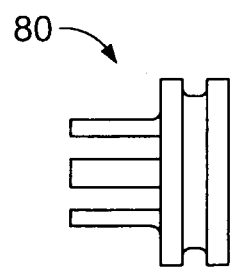
FIG. 11B is a side view of the plunger of FIG. 11.
Figure 11C:
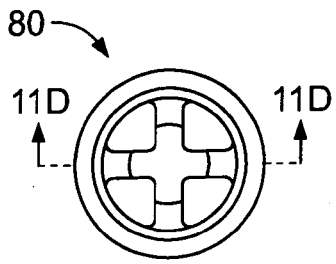
FIG. 11C is a bottom view of the plunger of FIG. 11.
Figure 11D:
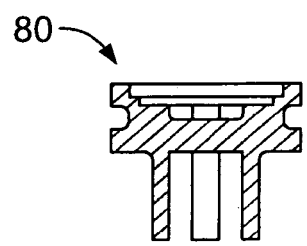
FIG. 11D is a side section view of the plunger, taken at the line 11D—11D of FIG. 11C.
Figure 11E:
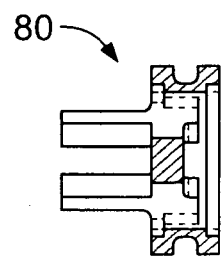
FIG. 11E is an oblique side section view of the plunger, taken at the line 11E—11E of FIG. 11A.

A sleeve 66 (FIGS. 9–9C), also formed, e.g., of DELRIN® 500, Natural, is positioned within the base element 50, resting upon the bottom wall 54 of the base element, with its circumferential outer surface 68 disposed in sealing relationship with opposed inner side wall surfaces of the base element, sealed by o-ring 70 (e.g., EPDM (70 durometer)). The sleeve 66 is secured in position, engaged with the bottom wall 54 of the base element 50, by seat cage 72 (FIGS. 10–10B), formed, e.g., of C36000 brass, with o-ring 74 (e.g., EPDM (70 durometer)) providing sealing between the circumferential outer surface 76 of the seat cage 72 and the opposed inner surface 78 of the cylindrical side wall 52 of the base element 50. A plunger 80 (FIGS. 11–11E), formed, e.g., of DELRIN® 500, Natural, is disposed within sleeve 66 and mounted for axial movement between engagement with the bottom wall 54 of the base element 50 and engagement with the shoulders 82 of the seat cage 72, with a spring 84 biasing the plunger upwards, towards engagement with shoulders 82. An o-ring 86 (e.g., EPDM (70 durometer)) provides sealing between the circumferential outer surface of the plunger 80 and the opposed inner surface 88 of the sleeve 66.

Figure 12:
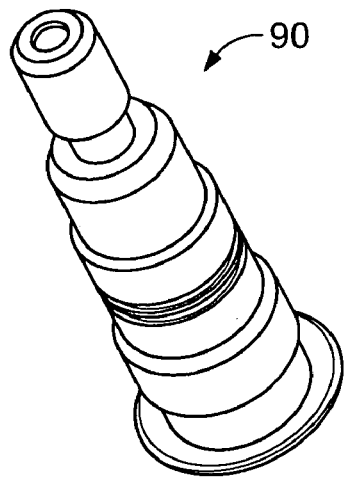
Figure 12A:
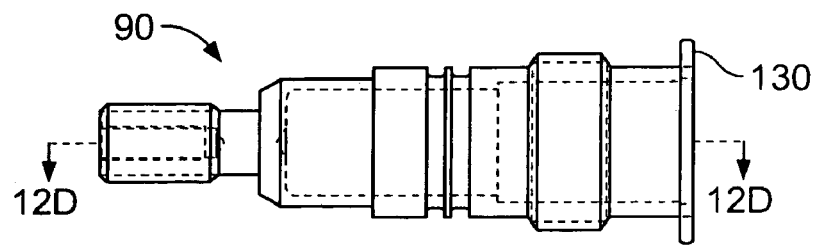
FIG. 12A is a front view of the stem of FIG. 12.
Figure 12B:
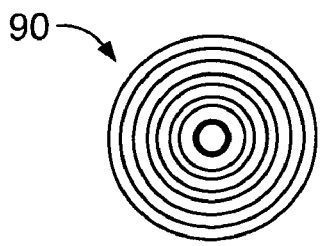
FIG. 12B is a top view of the stem of FIG. 12.
Figure 12C:
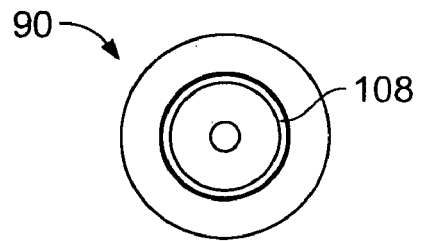
FIG. 12C is a bottom view of the stem of FIG. 12.
Figure 12D:
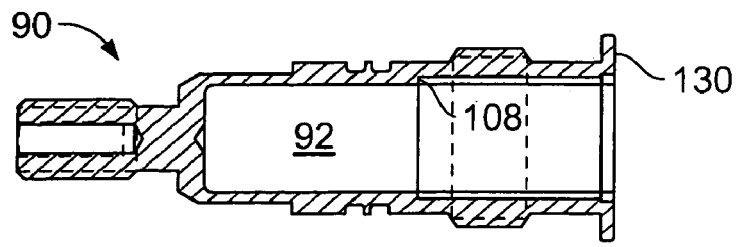
FIG. 12D is a side section view of the stem, taken at the line 12D—12D of FIG. 12A.
Figure 21:
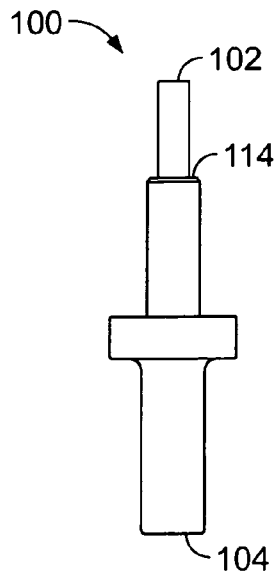
FIG. 21 is a front view of a wax element of the automatic compensating valve of FIG. 1.
Figure 22:
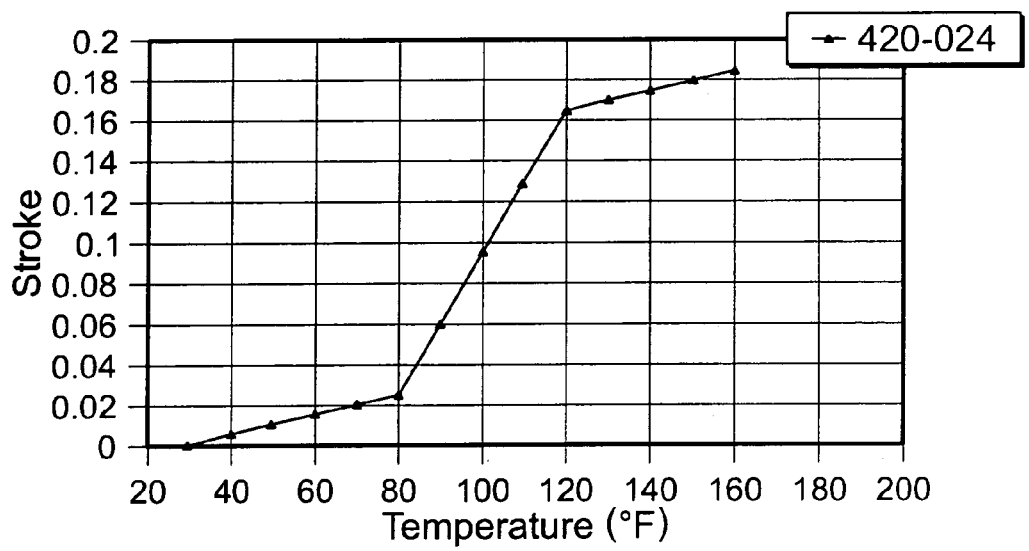
FIG. 22 is a plot of stroke versus temperature for the wax element of FIG. 21 in the automatic compensating valve of FIG. 1.

The stem subassembly 48 (FIGS. 7–7B) consists of stem 90 (FIGS. 12–12D) defining an elongated axial bore 92 containing spring 94 at its closed, upper end, engaged with overload insert 96 (FIGS. 13–13C). The spring 94 and overload insert 96 are secured within the tip region of the axial bore 92 by overload stop 98 (FIGS. 14–14C), which is pressed into the axial bore of the stem and into engagement with shoulder 108 defined by the inner wall 110 of the stem 90. The stem 90, overload insert 96 and overload stop 98 are formed, e.g., of C36000 brass. Referring also to FIG. 21, wax element 100 (of known construction that responds to changes over a range of temperature by increasing or decreasing in length according to a predetermined profile (FIG. 22)) is disposed with a first, upper end 102 engaged within the overload insert 96 and an opposite, lower end 104 engaged in plunger 80.

Figure 15:
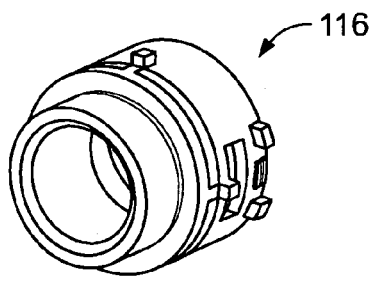
Figure 15A:
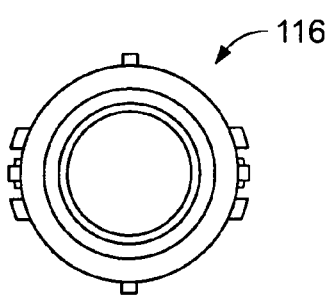
FIG. 15A is a top view of the cartridge nut of FIG. 15.
Figure 15B:
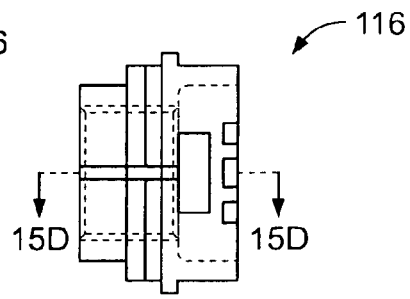
FIG. 15B is a front view of the cartridge nut of FIG. 15.
Figure 15C:
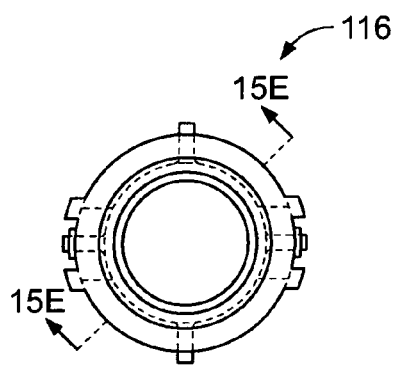
FIG. 15C is a bottom view of the cartridge nut of FIG. 15.
Figure 15D:
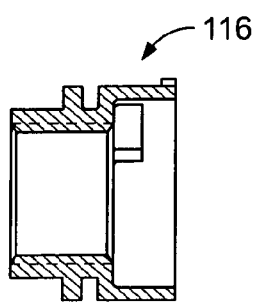
FIG. 15D is a side section view of the cartridge nut, taken at the line 15D—15D of FIG. 15B.
Figure 15E:
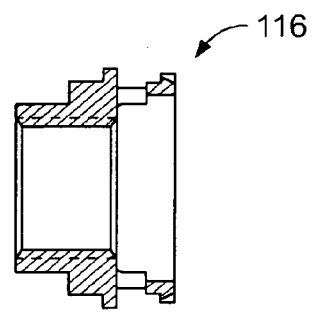
FIG. 15E is an oblique side section view of the cartridge nut, taken at the line 15E—15E of FIG. 15C.
Figure 16:
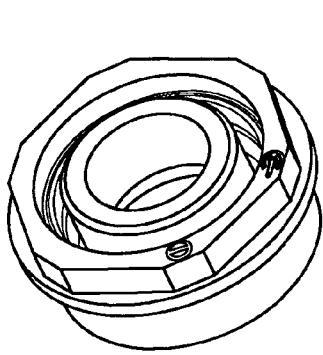
Figure 16A:
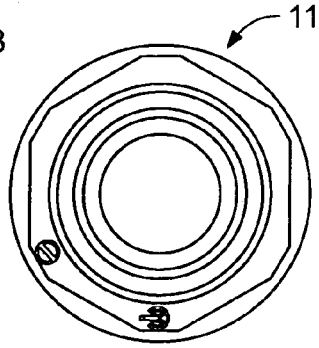
FIG. 16A is a top view of the bonnet of FIG. 16.
Figure 16B:
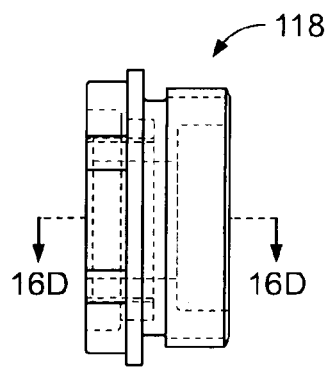
FIG. 16B is a front view of the bonnet of FIG. 16.
Figure 16C:
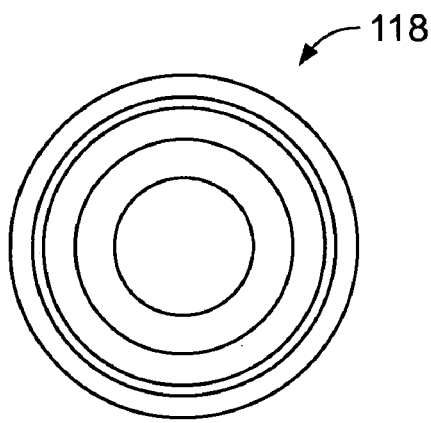
FIG. 16C is a bottom view of the bonnet of FIG. 16.
Figure 16D:
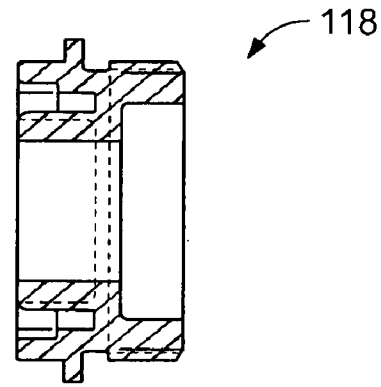
FIG. 16D is a side section view of the bonnet, taken at the line 16D—16D of FIG. 16B.
Figure 17:
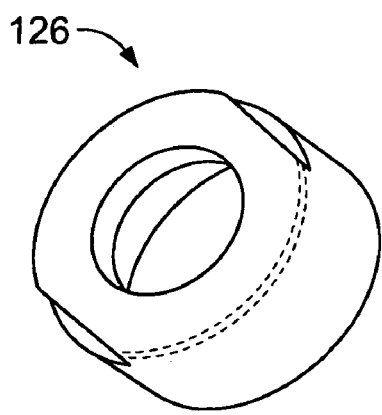
Figure 17A:
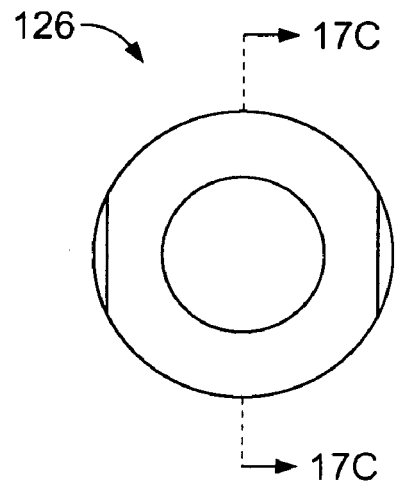
FIG. 17A is a top view of the high temperature stop of FIG. 17.
Figure 17B:
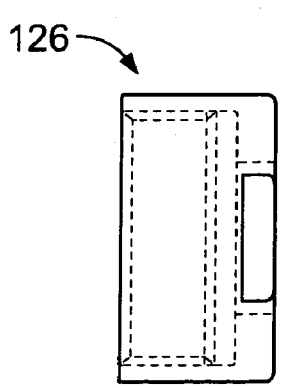
FIG. 17B is a side view of the high temperature stop of FIG. 17.
Figure 17C:
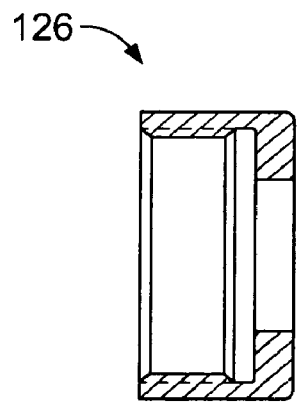
FIG. 17C is a side section view of the high temperature stop, taken at the line 17C—17C of FIG. 17A.

The axial position of stem subassembly 48 within the bore 18 of valve body 12 is adjusted by rotation of the stem 90, which causes the stem to rotate in engagement with the fixed cartridge nut 116 (FIGS. 15–15E), formed, e.g., of DELRIN® 500, Natural. The mixing subassembly 46 and the stem subassembly 48 are secured within the bore 18 of valve body 12 by bonnet 118 (FIGS. 16–16D), disposed in threaded engagement with the valve body. O-ring 120 (e.g., EPDM (70 durometer)) and o-rings 122, 124 (e.g., BUNA copolymer (70±5 durometer)) provide sealing between the bonnet 118 and the valve body 18 and between the bonnet 118 and the stem 90, respectively. High temperature stop 126 (FIGS. 17–17C), formed, e.g., of C36000 brass, disposed in threaded engagement with bonnet 118, is axially adjustable for setting a predetermined limit upon axial movement of the stem 90.

Shut-off gasket 128, formed, e.g., of EPDM (65 to 75 durometer), is mounted upon the upper surface of the seat cage 72, positioned for sealing engagement by an opposed valve surface 130 of the stem 90.

Figure 18:
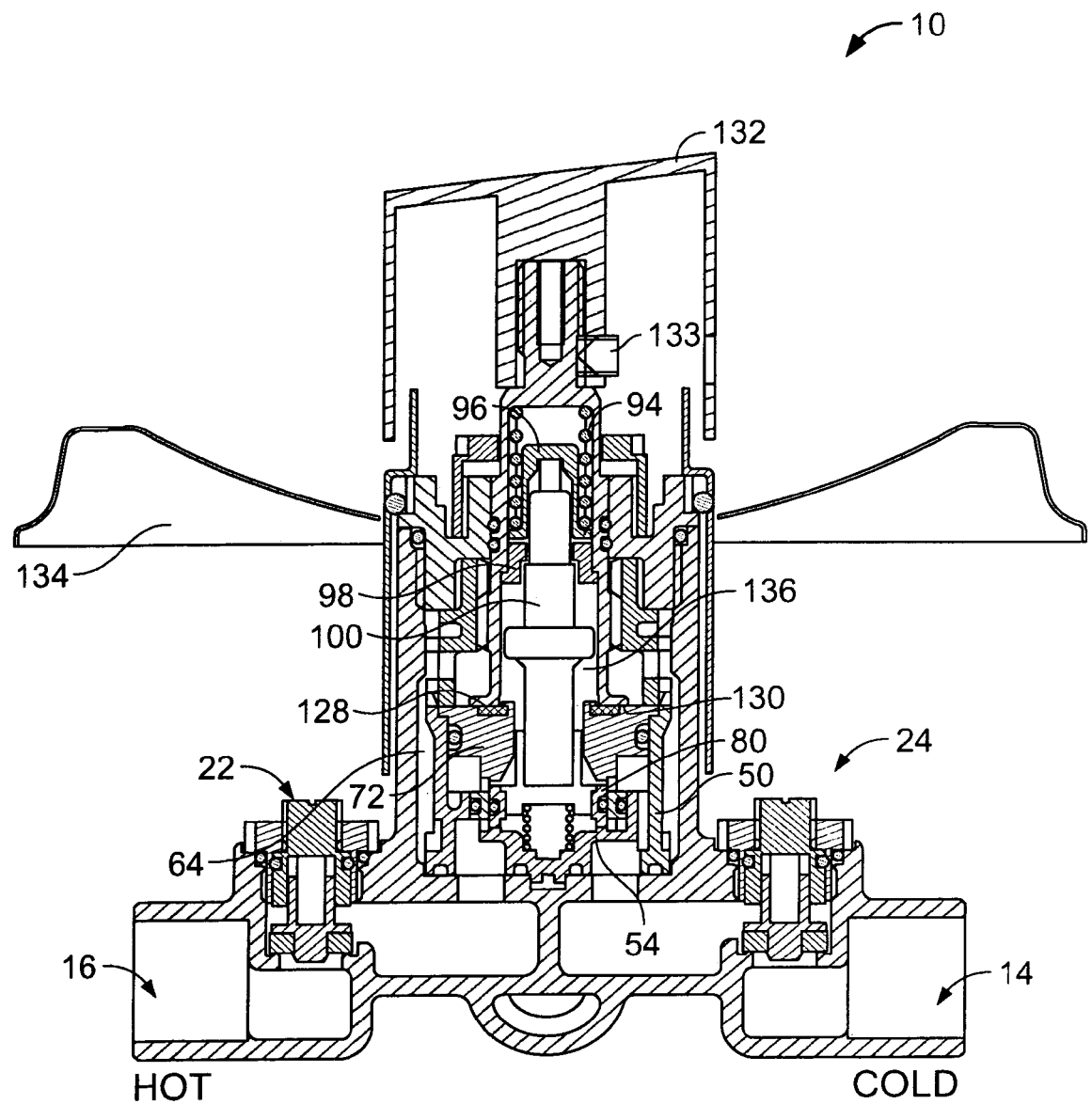
FIG. 18 is top section view of the automatic compensating valve of FIG. 1 shown in closed position, with no flow of water.
Figure 19:
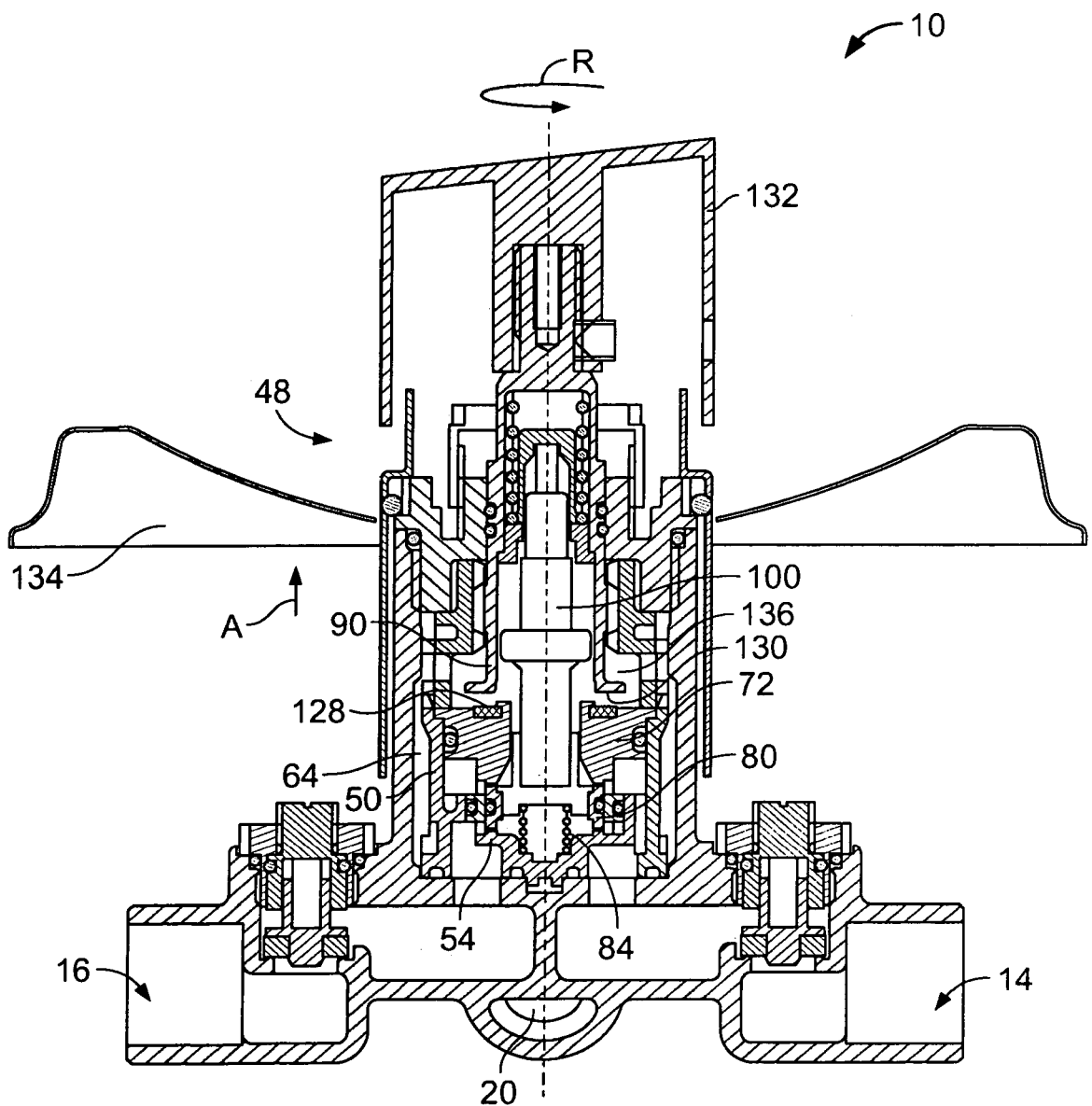
FIG. 19 is top section view of the automatic compensating valve of FIG. 1 show in partially open position for flow of mixed temperate water, e.g. at 105° F.
Figure 20:
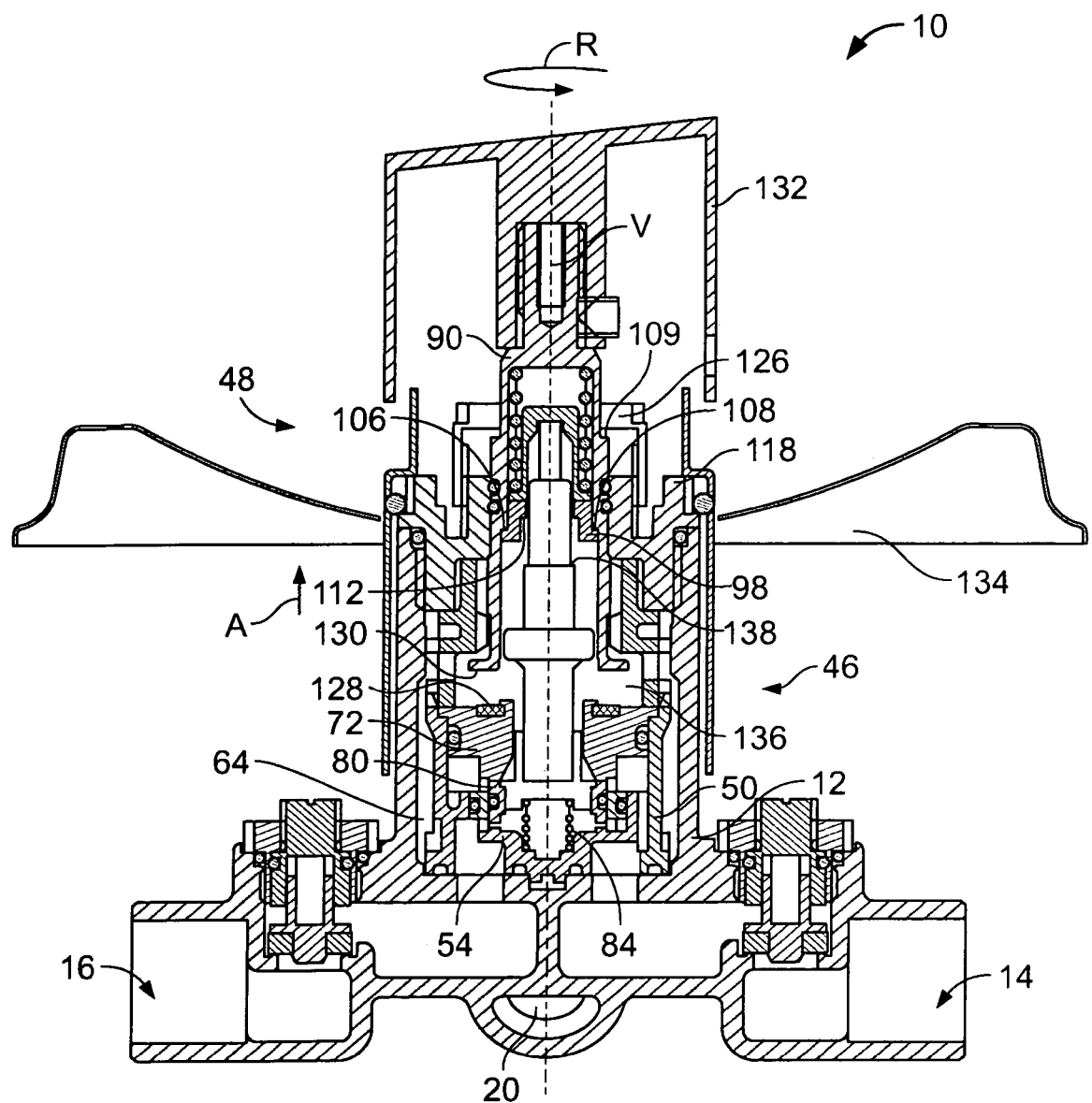
FIG. 20 is top section view of the automatic compensating valve of FIG. 1 shown in partially open position for flow of mixed hot water, e.g. at 140° F.

Referring to FIGS. 18–20 (in which the automatic compensating valve of the invention, e.g. for individual shower and tub/shower combination fixtures, is shown in top view, i.e. in reverse position from the bottom views of FIGS. 1 and 2), the valve 10 is shown with an actuator knob 132 fastened, e.g. by set screw 133, to the stem 90, and a face cover plate 134.

In FIG. 18, the valve 10 is shown in closed position, with the lower valve surface 130 of the stem 90 engaged upon the shutoff gasket 128 mounted to the upper surface of the seat cage 72 to resist flow through the valve. The poppet check and shutoff valve assemblies 22, 24 are also shown in closed position. The plunger 80, urged by spring 94 acting through overload insert 96, overload stop 98, and wax element 100, is seated against the bottom wall 54 of the base element 50, restricting flow of hot water from the hot water inlet flow passageway 16 into the water mixing region 136. In this position, the plunger 80 is spaced from engagement with the seat cage 72, thereby to permit initial flow of cold water when the valve is opened.

Referring next to FIG. 19, the valve 10 is shown in opening position, e.g., for outlet of blended water at 105° F. The actuator knob 132 has been rotated (arrow, R) to cause the stem subassembly 48 to rotate and move axially (arrow, A). Axial movement of the stem subassembly 48 removes the lower valve surface 130 of the stem 90 from engagement upon the shutoff gasket 128 mounted to the upper surface of the seat cage 72 to permit flow of water from the mixing chamber 136 toward the mixed temperate water outlet passageway 20. Initial flow of cold water into the mixing chamber causes the wax element 100 to decrease in overall length, which, in combination with axial movement of the stem subassembly 48, permits the spring 84 to move the plunger 80 away from engagement against the bottom wall 54 of the base element 50, thereby to permit flow of hot water from the hot water inlet flow passageway 16 into the water mixing region 136. In this position, the plunger 80 also remains spaced from engagement with the seat cage 72, thereby to permit continuing, but relatively reduced, flow of cold water into the mixing region 136, where it is mixed with the hot water before flowing as temperate mixed water toward the mixed temperate water outlet 20. Assuming inlet flow of cold water at 60° F. and inlet flow of hot water at 140° F., maximum outlet flow occurs at approximately 80° F. outlet temperature.

Referring next to FIG. 20, with further rotation of the actuator knob 132 (arrow, R), the valve 10 is shown in full open position, e.g., for outlet of blended water at 140° F. Rotation and axial movement of the stem subassembly 48 (arrow, A) spaces the lower valve surface 130 of the stem 90 further from engagement upon the shutoff gasket 128 mounted to the upper surface of the seat cage 72, thereby increasing the temperature of water flowing from the mixing chamber 136 toward the mixed temperate water outlet passageway 20, without further increase in flow volume. The axially-spaced position of the stem subassembly 48 permits the spring 84 to move the plunger further away from engagement against the bottom wall 54 of the base element 50, and into engagement with the seat cage 72, thereby to permit flow of a greater proportion of hot water from the hot water inlet flow passageway 16 into the water mixing region 136 while permitting no, or only a still further relatively reduced, flow of cold water into the mixing region 136.

Referring still, by way of example, to FIG. 20, as mentioned above, the flow of hot water and the flow of cold water past the plunger 80 and into the blended water mixing chamber 136 is generally radial, i.e. transverse to the axis, V, of the bore 18 (FIG. 3) of the valve body 12. As a result, adverse effects of axially-directed water pressure on the axial movement and positioning of the components of the mixing subassembly 46 and the stem subassembly 48 are minimized or avoided, thereby providing more consistent valve performance.

Again referring to FIG. 20, the range of axial movement permitted for the stem subassembly 48 (arrow, A) is restricted by engagement of outer shoulder 109 of the stem 90 with the high temperature stop 126. The position of the high temperature stop is adjustable by rotation of the stop in threaded engagement with the bonnet 118, and typically is set by a plumbing technician during installation.

A number of embodiments of the invention have been described. Nevertheless, it will be understood that various modifications may be made without departing from the spirit and scope of the invention. For example, referring to FIG. 20, over expansion of the wax element 100, e.g. due to high water temperature within the mixing region, may cause further expansion of the wax element 100, which, acting against the spring 84, urges the plunger 80 towards a position restricting flow of additional hot water into the mixing chamber 136. Accordingly, other embodiments are within the scope of the following claims.

What is claimed is:

1. An automatic compensating valve comprising:
a body including a bore extending into the body along an axis from an open end to an end wall of the body, and a cold water inlet, a hot water inlet, and a mixed water outlet communicating with the bore through the end wail of the bore;
a base element received in the bore of the body and including an end wall received over the end wall of the bore and defining orifices disposed in registration with the cold water inlet and the hot water inlet of the valve body, wherein a mixed water chamber connected to the mixed water outlet is partially located between a sidewall of the base element and the body;
an annular seat cage coaxially received in the bore of the body and secured in an open end of the base element, wherein the mixed water chamber extends through an opening of the seat cage;
a plunger coaxially received within the base element and movable along the axis between engagement with the end wall of the base element and the seat cage to control flow between the cold water orifice and the mixed water chamber, and between the hot water orifice and the mixed water chamber, and wherein the plunger and The orifices are arranged so that, when the plunger is axially moved towards the bottom wall of the base element, hot water flow is decreased and cold water flow is increased, and when the plunger is axially moved towards the seat were, hot water flow is increased and cold water flow is decreased;
a spring biasing the plunger towards engagement with the seat cage;
a stem coaxially extending into the bore of the body and including a valve surface for engagement with the seat cage for controlling mixed water flow to the mixed water outlet of the body;
a wax element axially extending between the stem and the plunger, wherein the wax element is adapted to increase in axial length when heated and decrease in axial length when cooled; and
an annular fixed cartridge nut coaxially fixed in position between the body and the stem, wherein the stem is in threaded engagement with the fixed cartridge nut such that rotation or the stem with respect to the fixed cartridge nut causes the stem to move axially within the body, whereby rotation of the stein controls the mixture of hot and cold water as well as the flow of mixed water.

2. A valve according to claim 1 wherein the orifices of the base element are arranged for flow of water transverse to axial movement of the plunger.

3. A valve according to claim 1 wherein the body further includes a cold water inlet flow passageway connected to the cold water inlet, a hot water inlet flow passageway connected to the hot water inlet, and a mixed water outlet flow passageway connected to the mixed water outlet, wherein each passageway extends generally traverse to the axis of the bore of the body.

4. A valve according to claim 3 further comprising a check valve assembly in each of the cold water inlet flow passageway and the hot water inlet flow passageway.

5. A valve according to claim 3 further comprising a shutoff valve assembly in each of the cold water inlet flow passageway and the hot water inlet flow passageway.

6. A valve according to chin 1 further comprising a bonnet securing the stem, the fixed cartridge nut, the seat cage, and the base element in the body of the valve.

7. A valve according to claim 1 further comprising an adjustable high temperature stop providing a limit upon axial movement of the stem.

8. A valve according to claim 1 further comprising a gasket on the seat cage in alignment with the lower valve surface of the stem.

9. A valve according to claim 1 further comprising an overload spring between the stem and the wax element.

10. A valve according to claim 1 further comprising an annular sleeve coaxially received about the plunger and extending between the bottom wall of the base element and the seat cage, wherein the sleeve include passages for the hot and cold water.

11. A valve according to claim 1 further comprising a bonnet securing the stem, the fixed cartridge nut, the seat cage, and the base element in the body of the valve, and wherein the fixed cartridge nut extends between the bonnet and the seat cage and defines passages the mixed water.

12. A valve according to claim 1 further comprising a face cover plate secured to the body and an actuator knob secured to the stem.

13. A valve comprising:
a body including a bore extending into the body along an axis from an open end to an end wall of the body, and a cold water inlet, a hot water inlet, and a mixed water outlet communicating with the bore through the end wall of the bore, wherein a mixed water chamber connected to the mixed water outlet is located in the bore of the body;
a plunger received within the bore and movable along the axis to control flow between the cold water orifice and the mixed water chamber, and between the hot water orifice and the mixed water chamber, and wherein the plunger and the orifices are arranged so that, when the plunger is axially moved towards the end wall of the bore, hot water flow is decreased and cold water flow is increased, and when the plunger is axially moved towards the open end of the bore, hot water flow is increased and cold water flow is decreased;
a spring biasing the plunger towards the open end of the bore;

an annular seat cage coaxially received in the bore of the body between the plunger and the open end of the bore, wherein the mixed water chamber extends through an opening of the seat cage;

a stem coaxially extending into the bore of the body and including a valve surface for engagement with the seat cage to prevent flow from the mixed water chamber to the mixed water outlet of the body, and whereby axial movement of the stem towards the open end of the bore and away from the seat cage allows how from the mixed water chamber to the mixed water outlet of the body;

a wax element axially extending through the opening of the annular seat cage and between the stem and the plunger, wherein the wax element is adapted to, increase in axial length and move the plunger towards the end wall of the bore when heated, and decrease in axial length and move the plunger towards the open end of the bore when cooled;

wherein the stem is in threaded engagement with respect to the body such that, rotation of the stem in a first direction causes the stem to move axially within the body towards the end wall of the bore to increase flow between the cold water orifice and the mixed water chamber, decrease flow between the hot water orifice and the mixed water chamber, and to ultimately cause the valve surface of the stem to engage the seat cage to prevent flow from the mixed water chamber to the mixed water outlet of the body, and rotation of the stem in a second direction causes the stem to move axially within the body towards the open end of the bore to cause the valve surface of the stem to disengage the seat cage to allow flow from the mixed water chamber to the mixed water outlet of the body, decrease flow between the cold water orifice and the mixed water chamber, and increase flow between the hot water orifice and the mixed water chamber; and wherein the body further includes a cold water inlet flow passageway connected to the cold water inlet, a hot water inlet flow passageway connected to the hot water inlet, and two mixed water outlet flow passageways connected to the mixed water outlet, wherein each passageway extends generally traverse to the axis of the bore of the body.

14. A valve according to claim 13 further comprising an overload spring between the stem and the wax element.

15. A valve according to claim 13 further comprising a check valve assembly in each of the cold water inlet flow passageway and the hot water inlet flow passageway.

16. A valve according to claim 13 further comprising a shutoff valve assembly in each of the cold water inlet flow passageway and the hot water inlet flow passageway.

17. A valve according to claim 13 further comprising a high temperature stop providing a limit upon axial movement of the stem.

18. A valve according to claim 13 further comprising a gasket on the seat cage in alignment with the lower valve surface of the stem.

19. A valve according to claim 13 further comprising an overload spring between the stem and the wax element.

20. A valve according to claim 13 further comprising a face cover plate secured to the body and an actuator knob secured to the stem.

* * * * *